No. 727,117. Patented May 5, 1903.

UNITED STATES PATENT OFFICE.

THOMAS A. EDISON, OF LLEWELLYN PARK, NEW JERSEY, ASSIGNOR TO EDISON STORAGE BATTERY COMPANY, OF ORANGE, NEW JERSEY, A CORPORATION OF NEW JERSEY.

REVERSIBLE GALVANIC BATTERY.

SPECIFICATION forming part of Letters Patent No. 727,117, dated May 5, 1903.

Application filed October 3, 1902. Serial No. 125,802. (No model.)

*To all whom it may concern:*

Be it known that I, THOMAS A. EDISON, a citizen of the United States, residing at Llewellyn Park, Orange, in the county of Essex and State of New Jersey, have invented a certain new and useful Improvement in Reversible Galvanic Batteries, of which the following is a description.

My invention relates to reversible galvanic batteries of the type heretofore suggested by me in which an alkaline electrolyte is used with insoluble active materials, the latter being preferably mixed with foliated or flake graphite or similar substance to increase the conductivity of the active material. The preferred combination which I employ includes oxid of nickel as the oxidizing or depolarizing element and metallic iron as the oxidizable element.

As an illustration of my invention I shall describe it in connection with the iron electrode of a reversible galvanic battery employing an alkaline electrolyte; but its applicability to other electrodes used with such solutions will of course be understood.

Broadly stated, my invention resides in the discovery that if an easily-reducible metal like copper, mercury, or silver is added to the iron or other active material in the make-up of an electrode for a reversible galvanic battery employing an alkaline electrolyte better electrical contact between the particles of the active material is secured, so that the weight of active material will be reduced more than the additional weight of the readily-reducible metal, while at the same time the cell will sustain a higher voltage through the entire period of discharge than would be the case if the readily-reducible metal were not used.

My objects, therefore, are, generally speaking, to insure better electrical contact between the particles forming the active material of an electrode in reversible galvanic batteries employing alkaline electrolytes, to reduce weight per unit of energy, and to produce a cell wherein a higher voltage may be sustained throughout the whole period of discharge than with batteries of the type heretofore suggested.

In a broad sense the invention consists in combining with the active material another material which is less oxidizable and more easily reduced to the metallic state than the active material and in such quantity as will be sufficient to cause a large bulk of the particles of the active material to be in metallic contact throughout the entire mass.

In carrying out my invention in connection with the iron electrode of an iron-nickel battery I proceed as follows: Finely-divided oxid of iron is reduced to the metallic state by hydrogen gas at about 900° Fahrenheit in any suitable and approved retort for the purpose. After the iron has thus been reduced it is permitted to cool to normal temperature while still surrounded by the gas, atmospheric air being excluded to prevent spontaneous oxidation. When the temperature of the iron has been sufficiently reduced, water is forced into the retort to expel the hydrogen gas, or the simultaneous introduction of water and withdrawal of the gas is effected in any desirable way. The introduction of water into the retort, as explained, prevents oxidation of the iron to its original condition of oxidation. While the reduced iron is wet, the retort is opened and the wet or moist contents are removed, surplus water being drained off. In this operation a slight heating takes place due to atmospheric oxidation; but the proportion of iron so oxidized is inconsiderable or at least unobjectionable. While the reduced iron is wet, moist, or damp, it may be mixed with graphite or other inert conducting material even when exposed to the air and molded into briquets for use in the complete cell without any serious oxidation taking place. To the iron in a moist condition I add sufficient ammoniated copper to produce as a final result a mixture composed of sixty-six per cent. of iron and thirty-three per cent. of copper, although these proportions may be varied considerably. The addition of ammoniated copper to the reduced iron results in the copper being immediately reduced to the metallic state by the reducing action of the iron, a portion of whose particles becomes oxidized. In this reaction ammonia is liberated as a gas. As a result of this treatment the exterior of each active iron particle will be coated with a porous envelop of copper mixed with iron oxid. This mixture may be immediately molded into briquets and used in the battery; but preferably about twenty per cent. of foliated or flake graphite is added thereto in order to supplement the coherence of the mass, render its manipulation more easy, and also increase electrical conductivity. I find in practice that the copper thus added serves to place nearly the whole of the active iron in good contact throughout the entire electrode, while at the same time the increased efficiency of the iron more than compensates for the added weight of the copper, so that the entire cell is somewhat lighter per unit of energy than if the copper is not used. I also find that the addition of copper as explained enables the cell to sustain a higher voltage through the whole period of discharge than is the case if iron and graphite are alone used. While the tendency of the copper is to dissolve in an alkaline solution when subjected to forced oxidation, I find that when added to an excess of reduced iron, as explained, the copper is not oxidized when the battery is discharging. During the charging operation the action on both the iron and copper is of a reducing instead of an oxidizing character. Consequently it becomes possible to add copper to the oxidizable electrode on discharge of an alkaline reversible galvanic battery without encountering any of the difficulties which would be met if used with a deoxidizable or depolarizing material on discharge.

While the process above indicated is that which I prefer to follow, it will of course be understood that many other methods of coating the active iron particles with copper can be used and will readily suggest themselves to chemists. Several of these alternative processes will be briefly referred to. For example, the red oxid of iron made by igniting ferrous oxalate at a very low temperature may be intimately mixed with dry ammoniated copper, the mixture being actively stirred while the moisture is being evaporated by heat. To this mixture about twenty per cent. of flake graphite is effectively added, and the composition is then molded into briquets and after being assembled is subjected to electrolytic reduction; but with this process long-continued use of the current is necessary to reduce the iron to a commercially active condition. Instead, therefore, of reducing the mixture electrolytically after being formed into briquets and assembled in the pockets of supporting-plates, as explained, it is more desirable to subject the mixture of red iron oxid and ammoniated copper to hot hydrogen gas, so that the copper will be entirely reduced to the metallic state and the iron partially or wholly so. After this reduction the mass may be allowed to cool in an atmosphere of hydrogen and be subsequently flooded with water to prevent atmospheric oxidation, after which it is mixed with flake graphite, as I have explained in connection with the preferred process.

Other salts of copper, such as acetate, can be employed in addition to the red oxid of iron, the mixture being subjected to sufficient heat to drive off the volatile radical of the salt and being then subsequently subjected to electrolytic or hydrogen reduction. Even the copper hydrate can be mixed with the red oxid of iron and the mixture subsequently reduced either electrolytically or by hydrogen treatment; but it will be understood that the method which I have first described is regarded as preferable, as it seems to give the best results in actual use.

Instead of copper any other readily-reducible material may be employed, such as mercury or silver. The latter material is obviously not at the present time practically available on account of its expense, but mercury can be effectively used under certain conditions. For instance, about fifteen per cent. of precipitated oxid of mercury may be mixed with finely-divided iron reduced by hydrogen, as explained, both being maintained in a damp or wet state, and to this mass about twenty per cent. of flake graphite may be added. Such an electrode when used in an alkaline solution possesses a marked increase in its discharging capacity over an electrode in which iron and graphite are alone used. With such an electrode on discharging the mercury, like the copper, remains in the metallic state and insures contact of the greater bulk of the active iron particles throughout the electrode.

I do not regard the use of an easily-reducible metal, like mercury or copper, as practically available in connection with a nickel or other depolarizing pole of an alkaline storage battery to thereby insure contact between the particles of active materials, for the reason that in charging such an electrode is subjected to forced oxidation, and the mercury or copper would therefore be also oxidized, in which condition it would not increase the contact between the nickel particles and would, moreover, be somewhat soluble in the solution. For the nickel or depolarizing pole of the battery, therefore, I prefer to use the electrode heretofore suggested by me, in which a mixture of nickel hydroxid and flake graphite is used, the large quantity of graphite employed insuring sufficient contact with the nickel particles for all practical purposes and the graphite being entirely unaffected by forced oxidation during the charging operation. It is preferable in assembling the battery that the proportion of electrolytically-active iron employed should be in excess of the oxidizing capacity of the nickel on discharge in order that when the battery is completely discharged a small proportion of the electrolytically-active iron will remain unoxidized. In this way I am able to prevent any oxidation of the added material with absolute certainty. Unless these proportions are observed care will have to be taken in discharging the battery not to carry the discharging operation so far as to result in oxidation of the added material.

Having now described my invention, what I claim as new, and desire to secure by Letters Patent, is as follows:

1. An electrode for a reversible galvanic battery employing an alkaline electrolyte, said electrode containing finely-divided metallic iron or an oxid thereof mixed with an easily-reducible metal, as and for the purposes set forth.

2. An electrode for a reversible galvanic battery employing an alkaline electrolyte, said electrode containing finely-divided metallic iron or an oxid thereof mixed with an inert conducting material and an easily-reducible metal, as and for the purposes set forth.

3. An electrode for a reversible galvanic battery employing an alkaline electrolyte, said electrode containing finely-divided metallic iron or an oxid thereof mixed with a flake-like inert conducting material and an easily-reducible metal, as and for the purposes set forth.

4. An electrode for a reversible galvanic battery employing an alkaline electrolyte, said electrode containing finely-divided metallic iron or an oxid thereof mixed with flake graphite and an easily-reducible metal, as and for the purposes set forth.

5. An electrode for a reversible galvanic battery employing an alkaline electrolyte, said electrode containing finely-divided metallic iron or an oxid thereof mixed with copper, as and for the purposes set forth.

6. An electrode for a reversible galvanic battery employing an alkaline electrolyte, said electrode containing finely-divided metallic iron or an oxid thereof mixed with copper and an inert flake-like conducting material, as and for the purposes set forth.

7. An electrode for a reversible galvanic battery employing an alkaline electrolyte, said electrode containing finely-divided metallic iron or an oxid thereof mixed with copper and flake graphite, as and for the purposes set forth.

8. An electrode for a reversible galvanic battery employing an alkaline electrolyte, said electrode containing an easily-reducible metal and finely-divided electrolytically-active iron or an oxid thereof, the proportion of the active material being sufficiently in excess of the easily-reducible metal to prevent oxidation of the latter on discharge, as and for the purposes set forth.

9. An electrode for a reversible galvanic battery employing an alkaline electrolyte, said electrode containing an easily-reducible metal, finely-divided electrolytically-active iron or an oxid thereof, the proportion of the active material being sufficiently in excess of the easily-reducible metal to prevent oxidation of the latter on discharge, and an inert flake-like conducting material, as and for the purposes set forth.

10. An electrode for a reversible galvanic battery employing an alkaline electrolyte, said electrode containing an easily-reducible metal, finely-divided electrolytically-active iron or an oxid thereof, the proportion of the active material being sufficiently in excess of the easily-reducible metal to prevent oxidation of the latter on discharge, and flake graphite admixed with the active material, as and for the purposes set forth.

11. An electrode for a reversible galvanic battery employing an alkaline electrolyte, said electrode containing copper and finely-divided electrolytically-active iron or an oxid thereof, the active material being sufficiently in excess of the copper to prevent oxidation of the latter on discharge, as and for the purposes set forth.

12. An electrode for a reversible galvanic battery employing an alkaline electrolyte, said electrode containing copper, finely-divided electrolytically-active iron or an oxid thereof, the active material being sufficiently in excess of the copper to prevent oxidation of the latter on discharge, and an inert flake-like conducting material, as and for the purposes set forth.

13. An electrode for a reversible galvanic battery employing an alkaline electrolyte, said electrode containing copper, finely-divided electrolytically-active iron or an oxid thereof, the active material being sufficiently in excess of the copper to prevent oxidation of the latter on discharge, and flake graphite, as and for the purposes set forth.

14. In a reversible galvanic battery employing an alkaline electrolyte, the combination with an electrode containing oxid of nickel as the oxygen storing or depolarizing element, of a second electrode containing electrolytically-active iron mixed with an easily-reducible metal, as and for the purposes set forth.

15. In a reversible galvanic battery employing an alkaline electrolyte, the combination with an electrode containing oxid of nickel as the oxygen storing or depolarizing element, of a second electrode containing electrolytically-active iron mixed with an easily-reducible metal and an inert flake-like conducting material, as and for the purposes set forth.

16. In a reversible galvanic battery employing an alkaline electrolyte, the combination with an electrode containing oxid of nickel as the oxygen storing or depolarizing element, of a second electrode containing electrolytically-active iron mixed with an easily-reducible metal and flake graphite, as and for the purposes set forth.

17. In a reversible galvanic battery employing an alkaline electrolyte, the combination with an electrode containing oxid of nickel as the oxygen storing or depolarizing element, of a second electrode containing electrolytically-active iron mixed with copper, as and for the purposes set forth.

18. In a reversible galvanic battery employing an alkaline electrolyte, an electrode containing as its active material an electrolytically-active insoluble metal, and a more easily reducible metal added thereto, as and for the purposes set forth.

19. In a reversible galvanic battery employing an alkaline electrolyte, an electrode containing as its active material an electrolytically-active insoluble metal, and a more easily reducible metal added thereto, the active material being in excess of the latter to prevent oxidation of the easily-reducible metal on discharge, as and for the purposes set forth.

20. In a reversible galvanic battery employing an alkaline electrolyte, an electrode containing as its active material an electrolytically-active insoluble metal, a more easily reducible metal added thereto, and an inert flake-like conducting material added to the mass, as and for the purposes set forth.

21. In a reversible galvanic battery employing an alkaline electrolyte, an electrode containing as its active material an electrolytically-active insoluble metal, a more easily reducible metal added thereto, the active material being in excess of the latter to prevent oxidation of the easily-reducible metal on discharge, and an inert flake-like conducting material added to the mass, as and for the purposes set forth.

22. In a reversible galvanic battery employing an alkaline electrolyte, the combination with an electrode containing an insoluble depolarizing active material, of a second electrode containing an insoluble active material which reduces with relative difficulty mixed with an easily-reducible metal, the proportion of the reducible active material being in excess of the easily-reducible metal and being also in excess of the capacity of the depolarizing material, whereby the latter on discharge will be prevented from oxidizing the readily-reducible material, as and for the purposes set forth.

23. In a reversible galvanic battery employing an alkaline electrolyte, the combination with an electrode containing hydrated oxid of nickel as the depolarizing material, of a second electrode containing a mixture of electrolytically-active iron and copper, the proportion of iron employed being in excess of the copper and being also in excess of the capacity of the nickel, whereby oxidation of the copper on discharge is prevented, as and for the purposes set forth.

This specification signed and witnessed this 29th day of September, 1902.

THOS. A. EDISON.

Witnesses:
FRANK L. DYER,
J. F. RANDOLPH.